(12) United States Patent
Batten et al.

(10) Patent No.: US 10,661,727 B2
(45) Date of Patent: May 26, 2020

(54) THERMAL CONTROL SYSTEM FOR A DIGITAL LICENSE PLATE

(71) Applicant: ReviverMx, Inc., Foster City, CA (US)

(72) Inventors: Dean Batten, North Bend, WA (US); Zachary Odenheimer, San Francisco, CA (US); Avi Kopelman, Sunnyvale, CA (US)

(73) Assignee: REVIVERMX, INC., Foster City, CA (US)

( * ) Notice: Subject to any disclaimer, the term of this patent is extended or adjusted under 35 U.S.C. 154(b) by 21 days.

(21) Appl. No.: 15/863,608

(22) Filed: Jan. 5, 2018

(65) Prior Publication Data

US 2018/0186308 A1    Jul. 5, 2018

Related U.S. Application Data

(60) Provisional application No. 62/442,764, filed on Jan. 5, 2017, provisional application No. 62/442,766, filed on Jan. 5, 2017.

(51) Int. Cl.

| | |
|---|---|
| *B60R 13/10* | (2006.01) |
| *G05B 15/02* | (2006.01) |
| *G05D 23/19* | (2006.01) |
| *G09F 21/04* | (2006.01) |
| *G09F 9/33* | (2006.01) |
| *G09F 9/35* | (2006.01) |
| *B60Q 1/56* | (2006.01) |
| *B60Q 1/50* | (2006.01) |

(52) U.S. Cl.
CPC ............... *B60R 13/10* (2013.01); *B60Q 1/503* (2013.01); *B60Q 1/56* (2013.01); *G05B 15/02* (2013.01); *G05D 23/1917* (2013.01); *G09F 9/33* (2013.01); *G09F 9/35* (2013.01); *G09F 21/048* (2013.01)

(58) Field of Classification Search
CPC ......... B60R 13/10; G09F 21/048; G09F 9/35; G09F 9/33; G05D 23/1917; G05B 15/02; B60Q 1/56
See application file for complete search history.

(56) References Cited

U.S. PATENT DOCUMENTS

| | | | |
|---|---|---|---|
| 4,001,822 | A | 1/1977 | Sterzer |
| 4,928,084 | A | 5/1990 | Reiser |
| 5,105,179 | A | 4/1992 | Smith |
| 5,132,666 | A | 7/1992 | Fahs |
| 5,155,689 | A | 10/1992 | Wortham |
| 5,299,132 | A | 3/1994 | Wortham |

(Continued)

FOREIGN PATENT DOCUMENTS

| | | |
|---|---|---|
| CA | 2102342 C | 1/1999 |
| CN | 1958342 A | 5/2007 |

(Continued)

*Primary Examiner* — Andrew Sasinowski
(74) *Attorney, Agent, or Firm* — David R. Stevens; Stevens Law Group

(57) ABSTRACT

Vehicle mounted exterior displays and digital license plates able to operate over a wide temperature range are disclosed. In one embodiment, heat relevant display parameters can be modified as critical low temperatures are approached. If decreasing temperature is determined to be likely to interfere with display switching operation, legally required information is displayed and potentially interfering content is eliminated.

19 Claims, 13 Drawing Sheets

(56) References Cited

U.S. PATENT DOCUMENTS

| | | |
|---|---|---|
| 5,381,155 A | 1/1995 | Gerber |
| 5,396,233 A | 3/1995 | Hofmann |
| 5,398,190 A | 3/1995 | Wortham |
| 5,404,664 A | 4/1995 | Brooks |
| 5,422,624 A | 6/1995 | Smith |
| 5,513,111 A | 4/1996 | Wortham |
| 5,519,621 A | 5/1996 | Wortham |
| 5,533,045 A | 7/1996 | Hasegawa |
| 5,552,789 A | 9/1996 | Schuermann |
| 5,579,008 A | 11/1996 | Hulderman |
| 5,608,391 A | 3/1997 | Bantli |
| 5,621,571 A | 4/1997 | Bantli |
| 5,627,549 A | 5/1997 | Park |
| 5,652,707 A | 7/1997 | Wortham |
| 5,657,008 A | 8/1997 | Bantli |
| 5,699,275 A | 12/1997 | Beasley |
| 5,717,374 A | 2/1998 | Smith |
| 5,747,938 A | 5/1998 | Beard |
| 5,818,010 A | 10/1998 | McCann |
| 5,832,394 A | 11/1998 | Wortham |
| 5,873,068 A | 2/1999 | Beaumont |
| 5,884,221 A | 3/1999 | Wortham |
| 5,937,392 A | 8/1999 | Alberts |
| 5,963,129 A | 10/1999 | Warner |
| 6,025,784 A | 2/2000 | Mish |
| 6,026,060 A | 2/2000 | Rothschild |
| 6,052,068 A | 4/2000 | Price |
| 6,067,008 A | 5/2000 | Smith |
| 6,085,805 A | 7/2000 | Bates |
| 6,108,954 A | 8/2000 | Eiteneer |
| 6,124,805 A | 9/2000 | Gabbard |
| 6,148,202 A | 11/2000 | Wortham |
| 6,229,434 B1 | 5/2001 | Knapp |
| 6,236,357 B1 | 5/2001 | Corwith |
| 6,239,757 B1 | 5/2001 | Ishikawa |
| 6,253,143 B1 | 6/2001 | Silvernagle |
| 6,298,306 B1 | 10/2001 | Suarez |
| 6,359,570 B1 | 3/2002 | Adcox |
| 6,388,388 B1 | 5/2002 | Weindorf |
| 6,404,327 B1 | 6/2002 | Naddeo |
| 6,411,217 B1 | 6/2002 | Gabbard |
| 6,489,897 B2 | 12/2002 | Simon |
| 6,545,596 B1 | 4/2003 | Moon |
| 6,553,131 B1 | 4/2003 | Neubauer |
| 6,556,905 B1 | 4/2003 | Mittelsteadt |
| 6,608,556 B2 | 8/2003 | De Moerloose |
| 6,641,038 B2 | 11/2003 | Gehlot |
| 6,678,612 B1 | 1/2004 | Khawam |
| 6,701,143 B1 | 3/2004 | Dukach |
| 6,717,527 B2 | 4/2004 | Simon |
| 6,728,605 B2 | 4/2004 | Lash |
| 6,731,238 B2 | 5/2004 | Johnson |
| 6,741,920 B1 | 5/2004 | Otto |
| 6,748,682 B1 | 6/2004 | Sims |
| 6,812,851 B1 | 11/2004 | Dukach |
| 6,842,121 B1 | 1/2005 | Tuttle |
| 6,850,209 B2 | 2/2005 | Mankins |
| 6,853,907 B2 | 2/2005 | Peterson |
| 6,864,784 B1 | 3/2005 | Loeb |
| 6,866,191 B2 | 3/2005 | Messina |
| 6,873,297 B1 | 3/2005 | Posluszny |
| 6,909,964 B2 | 6/2005 | Armstrong |
| 6,914,540 B2 | 7/2005 | Gongolas |
| 6,922,137 B1 | 7/2005 | Bycroft |
| 6,922,138 B2 | 7/2005 | Melvin |
| 6,968,176 B2 | 11/2005 | Juzswik |
| 7,015,792 B2 | 3/2006 | Lessard |
| 7,026,918 B2 | 4/2006 | Briick |
| 7,027,772 B2 | 4/2006 | Chen |
| 7,076,244 B2 | 7/2006 | Lazaridis |
| 7,096,102 B1 | 8/2006 | Parker, Sr. |
| 7,117,075 B1 | 10/2006 | Larschan |
| 7,142,104 B1 | 11/2006 | Blueford |
| 7,145,507 B2 | 12/2006 | Luo |
| 7,154,383 B2 | 12/2006 | Berquist |
| 7,161,563 B2 | 1/2007 | Vitale |
| 7,319,379 B1 | 1/2008 | Melvin |
| 7,383,983 B2 | 6/2008 | Gaumond |
| 7,389,198 B1 | 6/2008 | Dimitriadis |
| 7,394,403 B2 | 7/2008 | Winkler |
| 7,426,480 B2 | 9/2008 | Granger |
| 7,430,471 B2 | 9/2008 | Simon |
| 7,430,822 B1 | 10/2008 | Combs |
| 7,444,227 B2 | 10/2008 | Tengler |
| 7,449,998 B1 | 11/2008 | Au |
| 7,463,150 B2 | 12/2008 | Rajan |
| 7,466,241 B2 | 12/2008 | Lyle |
| 7,478,492 B2 | 1/2009 | Madonia |
| 7,482,910 B2 | 1/2009 | Melvin |
| 7,498,929 B2 | 3/2009 | Pedrick |
| 7,502,827 B2 | 3/2009 | Arfaa |
| 7,504,965 B1 | 3/2009 | Windover |
| 7,525,433 B2 | 4/2009 | Tanaka |
| 7,535,342 B2 | 5/2009 | Tanaka |
| 7,536,189 B2 | 5/2009 | Himmelstein |
| 7,551,088 B2 | 6/2009 | Findlay |
| 7,554,464 B1 | 6/2009 | Oberdorfer |
| 7,565,141 B2 | 7/2009 | Macaluso |
| 7,595,740 B2 | 9/2009 | Pechenick |
| RE41,085 E | 1/2010 | Anthonyson |
| 7,657,373 B2 | 2/2010 | Kindo |
| 7,696,864 B2 | 4/2010 | Dillon |
| 7,714,703 B2 | 5/2010 | Tanaka |
| 7,825,790 B2 | 11/2010 | Tallinger |
| 7,909,974 B2 | 3/2011 | Bartels |
| 7,920,047 B2 | 4/2011 | Bates |
| 7,923,962 B2 | 4/2011 | Jovanovich |
| 8,035,503 B2 | 10/2011 | Partin |
| 8,068,266 B2 | 11/2011 | Kim |
| 8,180,279 B2 | 5/2012 | Crowley |
| 8,188,850 B2 | 5/2012 | Smith |
| 8,223,010 B2 | 7/2012 | Petite |
| 8,232,865 B2 | 7/2012 | Bates |
| 8,250,366 B2 | 8/2012 | Longobardi |
| 8,250,793 B1 | 8/2012 | Halula |
| 8,264,778 B2 | 9/2012 | Kim |
| 8,269,716 B2 | 9/2012 | Shen |
| 8,294,634 B2 | 10/2012 | Weitbruch |
| 8,332,095 B2 | 12/2012 | Hembury |
| 8,334,961 B2 | 12/2012 | Montbach |
| 8,344,890 B2 | 1/2013 | Zhu |
| 8,353,372 B2 | 1/2013 | Dorais |
| 8,373,917 B2 | 2/2013 | Chen |
| 8,427,753 B2 | 4/2013 | Bartels |
| 8,456,728 B2 | 6/2013 | Chen |
| 8,488,096 B2 | 7/2013 | Aoki |
| 8,525,817 B2 | 9/2013 | Sah |
| 8,529,686 B2 | 9/2013 | Chao |
| 8,593,713 B2 | 11/2013 | Wu |
| 8,631,921 B2 | 1/2014 | Jones |
| 8,633,800 B2 | 1/2014 | Bates |
| 8,656,165 B2 | 2/2014 | Longobardi |
| 8,662,279 B2 | 3/2014 | Jones |
| 8,675,273 B2 | 3/2014 | Yang |
| 8,684,158 B2 | 4/2014 | Jones |
| 8,760,746 B2 | 6/2014 | Tian |
| 8,798,806 B2 | 8/2014 | Lev |
| 8,830,558 B2 | 9/2014 | Kuo |
| 8,842,360 B2 | 9/2014 | Shim |
| 8,868,099 B2 | 10/2014 | Espinosa de los Monteros et al. |
| 8,879,229 B2 | 11/2014 | Cheng |
| 8,922,871 B2 | 12/2014 | Choi |
| 8,938,614 B2 | 1/2015 | Fischer |
| 9,007,193 B2 | 4/2015 | Boston |
| 9,013,779 B2 | 4/2015 | Lee |
| 9,123,184 B2 | 9/2015 | Jones |
| 9,158,105 B2 | 10/2015 | Chen |
| 9,182,588 B2 | 11/2015 | Shin |
| 9,182,590 B2 | 11/2015 | Nomura |
| 9,201,235 B2 | 12/2015 | Jung |
| 9,221,405 B2 | 12/2015 | Davis |
| 9,275,503 B2 | 3/2016 | Chen |
| 9,317,724 B2 | 4/2016 | Matsur |
| 9,483,777 B2 | 11/2016 | Sarangi |

(56) References Cited

U.S. PATENT DOCUMENTS

| | | |
|---|---|---|
| 9,615,430 B2 | 4/2017 | Meritt |
| 9,663,028 B2 | 5/2017 | Parkes |
| 9,663,043 B2 | 5/2017 | Belegu |
| 9,748,062 B2 | 8/2017 | Pinto, IV |
| 9,902,343 B2 | 2/2018 | Hague |
| 9,940,089 B2 | 4/2018 | Bender |
| 10,053,028 B2 | 8/2018 | Haque |
| 10,112,528 B1 | 10/2018 | Mazuir |
| 10,181,104 B2 | 1/2019 | Haque |
| 2001/0003319 A1 | 5/2001 | Beckert |
| 2002/0021210 A1* | 2/2002 | Naddeo .............. B60Q 1/56 340/425.5 |
| 2002/0044069 A1 | 4/2002 | Jenkinson |
| 2002/0097193 A1 | 7/2002 | Powers |
| 2003/0034934 A1 | 2/2003 | Brewer |
| 2003/0050744 A1 | 3/2003 | Saraiva |
| 2003/0112242 A1 | 6/2003 | Vitale |
| 2003/0140536 A1 | 7/2003 | Bilyeu |
| 2003/0142044 A1 | 7/2003 | Berry |
| 2003/0200227 A1 | 10/2003 | Ressler |
| 2004/0004539 A1 | 1/2004 | Collins |
| 2004/0021579 A1 | 2/2004 | Oursler |
| 2004/0050936 A1 | 3/2004 | Look |
| 2004/0128891 A1 | 7/2004 | Keach |
| 2004/0130521 A1 | 7/2004 | Kim |
| 2004/0189493 A1 | 9/2004 | Estus |
| 2004/0207526 A1 | 10/2004 | Liao |
| 2004/0210757 A1 | 10/2004 | Kogan |
| 2004/0226204 A1 | 11/2004 | Green |
| 2004/0230480 A1 | 11/2004 | Kanayama |
| 2004/0263357 A1 | 12/2004 | Hamilton |
| 2005/0192744 A1 | 9/2005 | Maqui |
| 2005/0198876 A1 | 9/2005 | Chang |
| 2005/0274050 A1 | 12/2005 | Liu |
| 2006/0142933 A1 | 6/2006 | Feng |
| 2006/0164258 A1 | 7/2006 | Garibotto |
| 2006/0213100 A1 | 9/2006 | Mccann |
| 2006/0227010 A1 | 10/2006 | Berstis |
| 2007/0008084 A1 | 1/2007 | Wu |
| 2007/0038353 A1 | 2/2007 | Larschan |
| 2007/0046499 A1 | 3/2007 | Mckenna |
| 2007/0132664 A1 | 6/2007 | Weissman |
| 2007/0136900 A1 | 6/2007 | Watters |
| 2007/0229443 A1 | 10/2007 | Sawada |
| 2007/0285361 A1 | 12/2007 | Jovanovich |
| 2008/0042848 A1 | 2/2008 | Roberts |
| 2008/0059299 A1 | 3/2008 | Hamoui |
| 2008/0120875 A1 | 5/2008 | Yen |
| 2008/0129540 A1 | 6/2008 | Williams |
| 2008/0150854 A1 | 6/2008 | Bryant |
| 2008/0178502 A1 | 7/2008 | Stuchell |
| 2008/0252457 A1 | 10/2008 | Findlay |
| 2008/0258938 A1 | 10/2008 | Moon |
| 2009/0195171 A1 | 8/2009 | Huang |
| 2009/0288320 A1 | 11/2009 | El Emam |
| 2009/0289580 A1 | 11/2009 | Dunn |
| 2009/0299857 A1 | 12/2009 | Brubaker |
| 2010/0245221 A1 | 9/2010 | Khan |
| 2010/0259058 A1 | 10/2010 | Knighton |
| 2010/0286906 A1 | 11/2010 | Nogawa |
| 2011/0015971 A1 | 1/2011 | Hembury |
| 2011/0037619 A1 | 2/2011 | Ginsberg |
| 2011/0078933 A1 | 4/2011 | Lukawitz |
| 2011/0140996 A1 | 6/2011 | Parry-jones |
| 2011/0252675 A1 | 10/2011 | Thomas |
| 2011/0291822 A1 | 12/2011 | Boston |
| 2011/0295697 A1 | 12/2011 | Boston |
| 2011/0296190 A1* | 12/2011 | Paeschke .............. B60R 13/10 713/176 |
| 2012/0181340 A1 | 7/2012 | Hsu |
| 2012/0242633 A1 | 9/2012 | Kim |
| 2012/0303458 A1 | 11/2012 | Schuler, Jr. |
| 2013/0006775 A1 | 1/2013 | Jordan |
| 2013/0250396 A1 | 9/2013 | Kim |
| 2013/0258443 A1 | 10/2013 | Jung |
| 2013/0293349 A1 | 11/2013 | Templ |
| 2013/0325629 A1 | 12/2013 | Harrison |
| 2014/0019230 A1 | 1/2014 | Lawson |
| 2014/0049807 A1 | 2/2014 | Kato |
| 2014/0090280 A1 | 4/2014 | Cunningham |
| 2014/0249713 A1 | 9/2014 | Davis |
| 2015/0039365 A1 | 2/2015 | Haque |
| 2015/0353031 A1 | 12/2015 | Cairo |
| 2015/0365479 A1 | 12/2015 | Cunningham |
| 2015/0379578 A1 | 12/2015 | Mendoza |
| 2016/0037606 A1* | 2/2016 | Dunn .............. H05B 33/0872 349/61 |
| 2016/0039364 A1 | 2/2016 | Findlay |
| 2017/0066408 A1 | 3/2017 | Nyalamadugu |

FOREIGN PATENT DOCUMENTS

| | | |
|---|---|---|
| CN | 201029037 Y | 2/2008 |
| CN | 100397415 C | 6/2008 |
| CN | 101325002 B | 9/2010 |
| CN | 102152764 B | 8/2012 |
| EP | 0648653 A1 | 4/1995 |
| GB | 2275808 A | 9/1994 |
| GB | 2436884 A | 10/2007 |
| JP | 3956865 B2 | 8/2007 |
| WO | WO/1196/036031 A1 | 11/1996 |

\* cited by examiner

600

700

| Initial Brightness | Brightness Decrease | New Brightness | Initial Temperature | New Temperature | Temperature Decrease |
|---|---|---|---|---|---|
| 240 | 20% | 192 | 81.7 | 74.7 | 8.5% |
| 220 | 20% | 176 | 78.8 | 72.4 | 8.1% |
| 200 | 20% | 160 | 75.9 | 70.1 | 7.6% |
| 180 | 20% | 144 | 73.0 | 67.8 | 7.2% |
| 160 | 20% | 128 | 70.1 | 65.4 | 6.6% |
| 140 | 20% | 112 | 67.2 | 63.1 | 6.0% |
| 120 | 20% | 96 | 64.3 | 60.8 | 5.4% |
| 100 | 20% | 80 | 61.4 | 58.5 | 4.7% |
| 240 | 15% | 204 | 81.7 | 76.5 | 6.4% |
| 220 | 15% | 187 | 78.8 | 74.0 | 6.1% |
| 200 | 15% | 170 | 75.9 | 71.5 | 5.7% |
| 180 | 15% | 153 | 73.0 | 69.1 | 5.4% |
| 160 | 15% | 136 | 70.1 | 66.6 | 5.0% |
| 140 | 15% | 119 | 67.2 | 64.1 | 4.5% |
| 120 | 15% | 102 | 64.3 | 61.7 | 4.1% |
| 100 | 15% | 85 | 61.4 | 59.2 | 3.5% |
| 240 | 10% | 216 | 81.7 | 78.2 | 4.3% |
| 220 | 10% | 198 | 78.8 | 75.6 | 4.0% |
| 200 | 10% | 180 | 75.9 | 73.0 | 3.8% |
| 180 | 10% | 162 | 73.0 | 70.4 | 3.6% |
| 160 | 10% | 144 | 70.1 | 67.8 | 3.3% |
| 140 | 10% | 126 | 67.2 | 65.2 | 3.0% |
| 120 | 10% | 108 | 64.3 | 62.5 | 2.7% |
| 100 | 10% | 90 | 61.4 | 59.9 | 2.4% |

THERMAL CONTROL SYSTEM FOR A DIGITAL LICENSE PLATE

RELATED APPLICATIONS

This application claims the benefit of U.S. Provisional Application Ser. No. 62/442,764, filed Jan. 5, 2017 and U.S. Provisional Application Ser. No. 62/442,766, filed Jan. 5, 2017. The applications are incorporated herein by reference for all purposes.

TECHNICAL FIELD

The present disclosure relates to vehicle mounted exterior displays, and more specifically to digital license plates able to operate over a wide temperature range.

BACKGROUND

Conventional stamped license plates for vehicles have long been used, despite difficulties in updating license numbers and their susceptibility to theft or alteration. Instead of stamped license plates, a dynamic display that presents vehicle identification and registration information can be arranged on the exterior of a vehicle. For example, U.S. Pat. No. 9,007,193, and pending published US Patent application US20130006775, both assigned to ReviverMX, describe a dynamic display that improves updateability of vehicle identification and registration information by use of a digital license plate.

However, digital systems with dynamic displays that are exposed to the environment must be able to operate under both extremely cold and extremely hot conditions. For example, conventional electronic devices such as computer laptops suffer from temperature extremes. Liquid Crystal Displays (LCDs) of laptops or smartphones can freeze and be rendered inoperable, while high temperatures can cause breakdown of both the display and processors or other electronic components. Laptops and smartphones are typically able to work only within a relatively narrow safe temperature range, often 50 to 95 degrees F. (10-35 degrees C.). This range refers both to optimal usage temperature of the outside environment and the temperature the electronic device is ordinarily warmed to before use. Such a limited temperature range is not sufficient for a digital license plate, which must be able to operate at temperatures below freezing and above 40 degrees Celsius.

In addition to temperature considerations, displays must be able to operate in environments that include substantial amounts of vibration, dust, or thrown gravel. Ideally, displays should be able to operate at minimal power levels.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 7 is table illustrating the effect of decreasing display brightness on system temperature;

DETAILED DESCRIPTION

Figure 1:
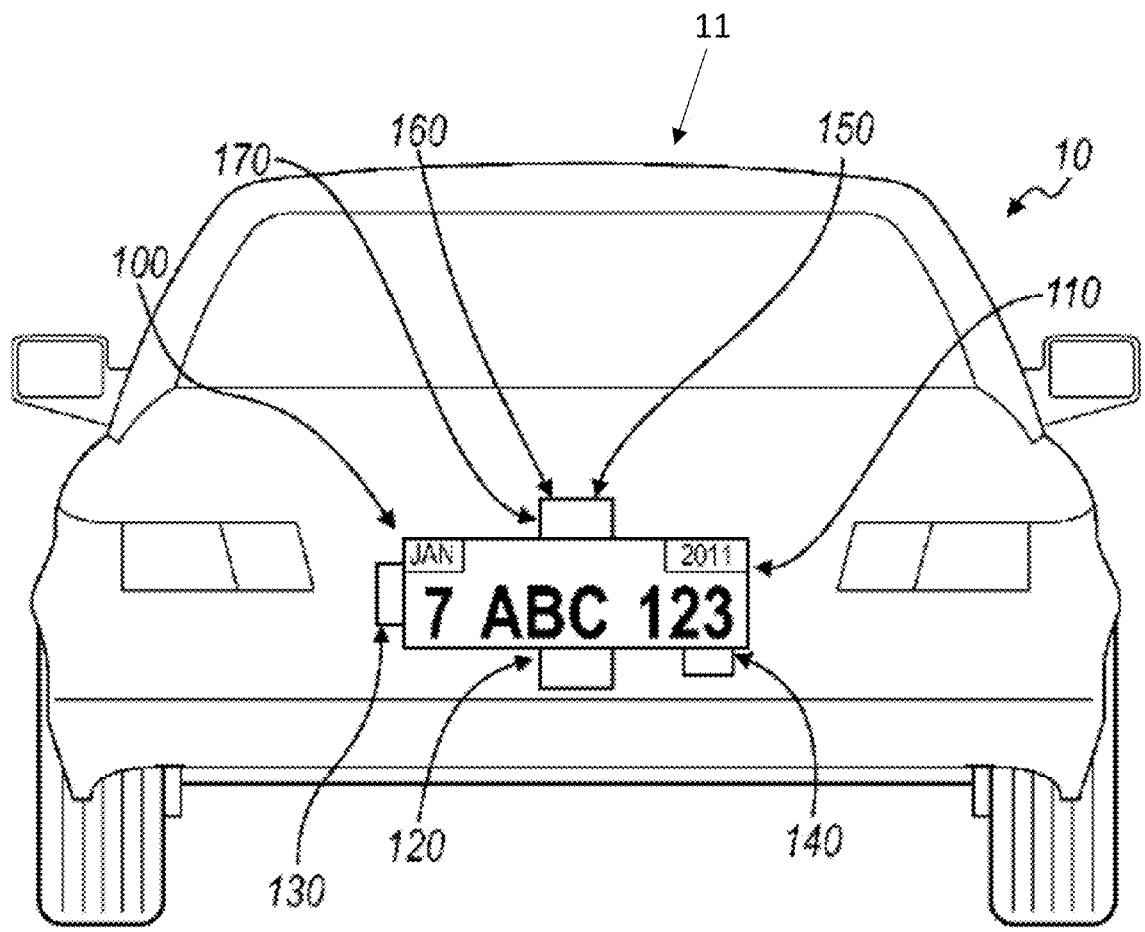
FIG. 1 illustrates one embodiment of a digital license plate system.

FIG. 1 illustrates one embodiment of a digital license plate system 11 supporting a dynamic display that presents vehicle identification and registration information and can be arranged on an exterior of a vehicle 10. The system 10 includes a display system 100 for use on the exterior of a vehicle 10 includes a display 110, a vehicle speed sensor 120, and a processor 130 coupled to the vehicle speed sensor 120. The processor 130 is configured to implement one of three operational modes of the display system 100 based on the speed and state of the vehicle 10: a first operational mode, wherein a first content, including identification information of the vehicle 10 and/or registration information of the vehicle 10 is rendered on the display 110 at a first power consumption level; a second operational mode, wherein a second content, including a message, identification information of the vehicle 10, and/or registration information of the vehicle 10, is rendered on the display 110; and a third operational mode, wherein content is rendered on the display 110 at a second power consumption level less than the first power consumption level. The display system 100 preferably also includes a communication device 140 that allows content (for example, updated identification information, registration information, and/or messages) to be transferred to and from the display system 100. The display system 100 may also include a location sensor 160, for example, a Global Positioning System (GPS) device, a cellular tower location triangulation device, or any other suitable location sensor that determines the location of the vehicle 10 on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110. The display system 100 may further comprise a sensor that determines the proximity of the vehicle 10 to a second vehicle.

The digital license plate system 11 is preferably used for registered vehicles such as personal cars, trucks, motorcycles, rental cars, corporately-owned cars, or any other suitable type of vehicle. The display system 100 functions to render identification and/or registration information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In a first example, the backlight of the display 110 may be at the lowest light intensity in the third mode. In a second example, in the variation of the display 110 that is e-ink, the backlight of the display 110 may be turned off, allowing only the e-ink, which is bistable and does not require additional power to maintain, to be visible. The method and arrangement to decrease the power consumption of the display 110 in the third operational mode is preferably one of the two above variations, but may alternatively be a combination of the above variations or any other suitable method or arrangement.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle 10, such as age, ethnicity, or gender; the database may be maintained by an entity such as a DMV or the American Automobile Association (AAA). Alternatively, the camera may be configured to determine directly the demographic of the driver of the second vehicle (for example, by matching the driver to a specific ethnicity by with facial recognition software) or the response of the driver of the second vehicle to a message rendered on the display 120. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
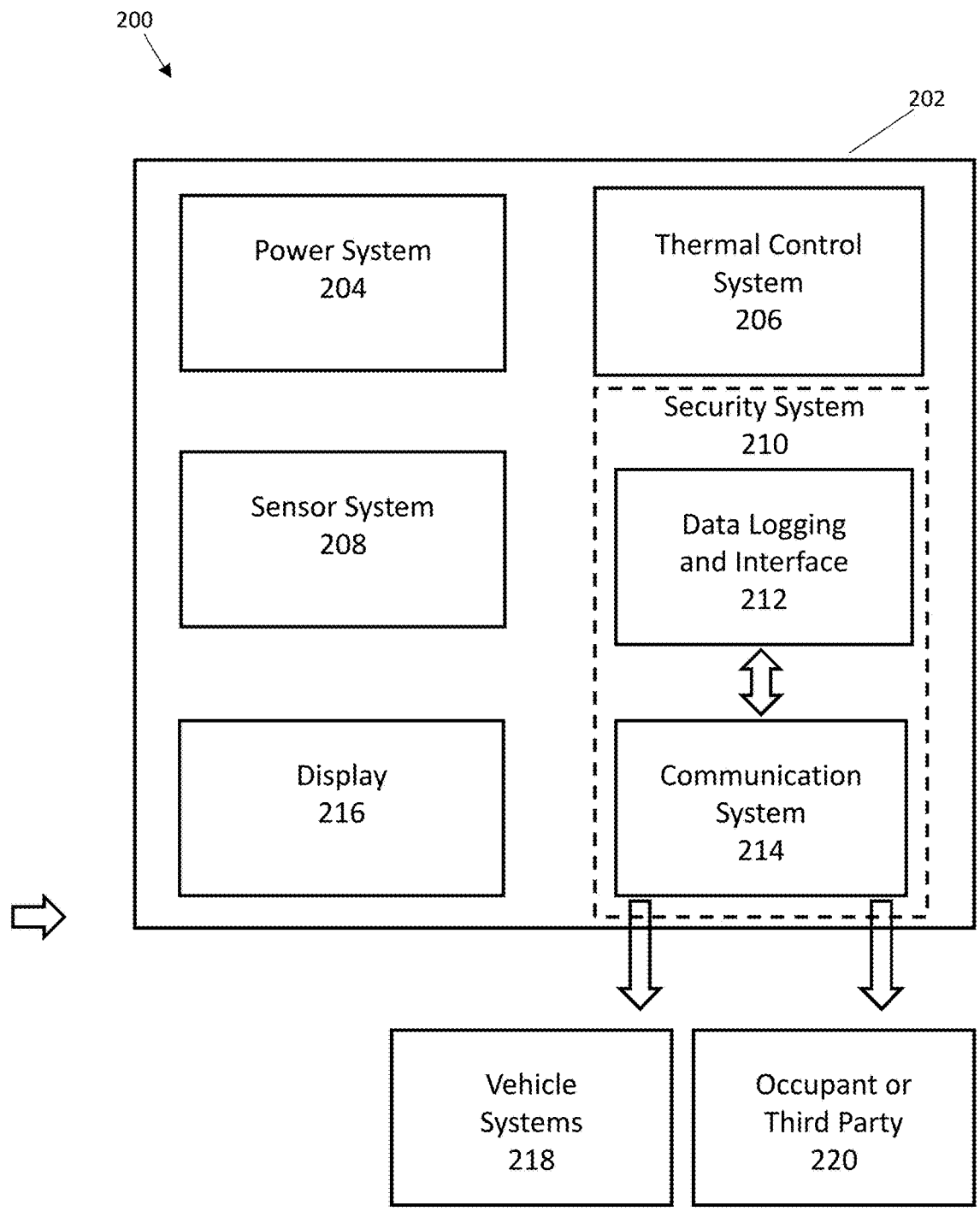
FIG. 2 illustrates various systems in a digital license plate system.

FIG. 2 illustrates various systems, sub-systems, or modules that can be incorporated into a digital license plate system 200, along potential interacting agents such as vehicle systems 218, vehicle occupants, or third party persons or automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216.

Figure 3:
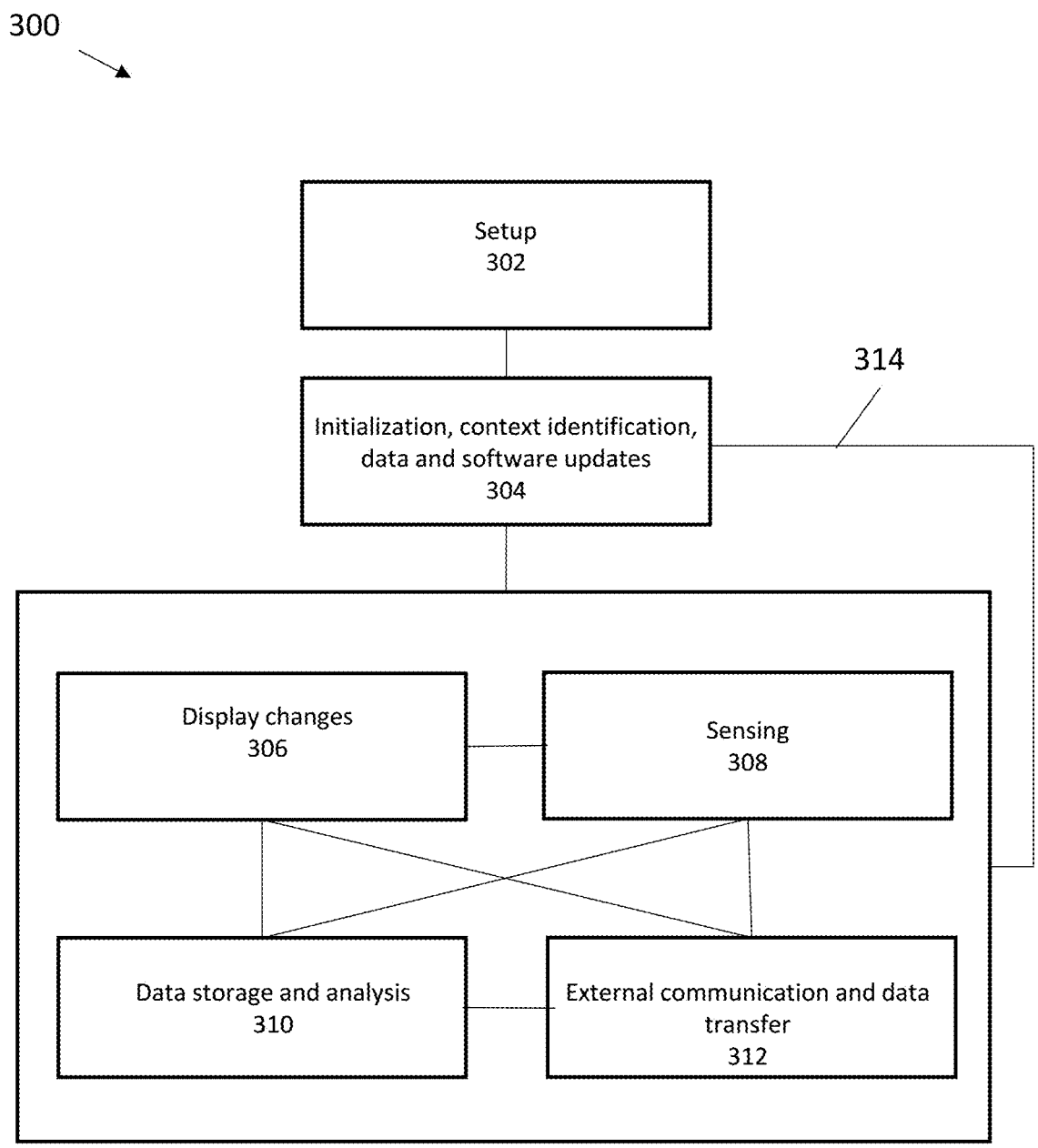
FIG. 3 illustrates operation of a digital license plate system.

FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304.

Figure 4:
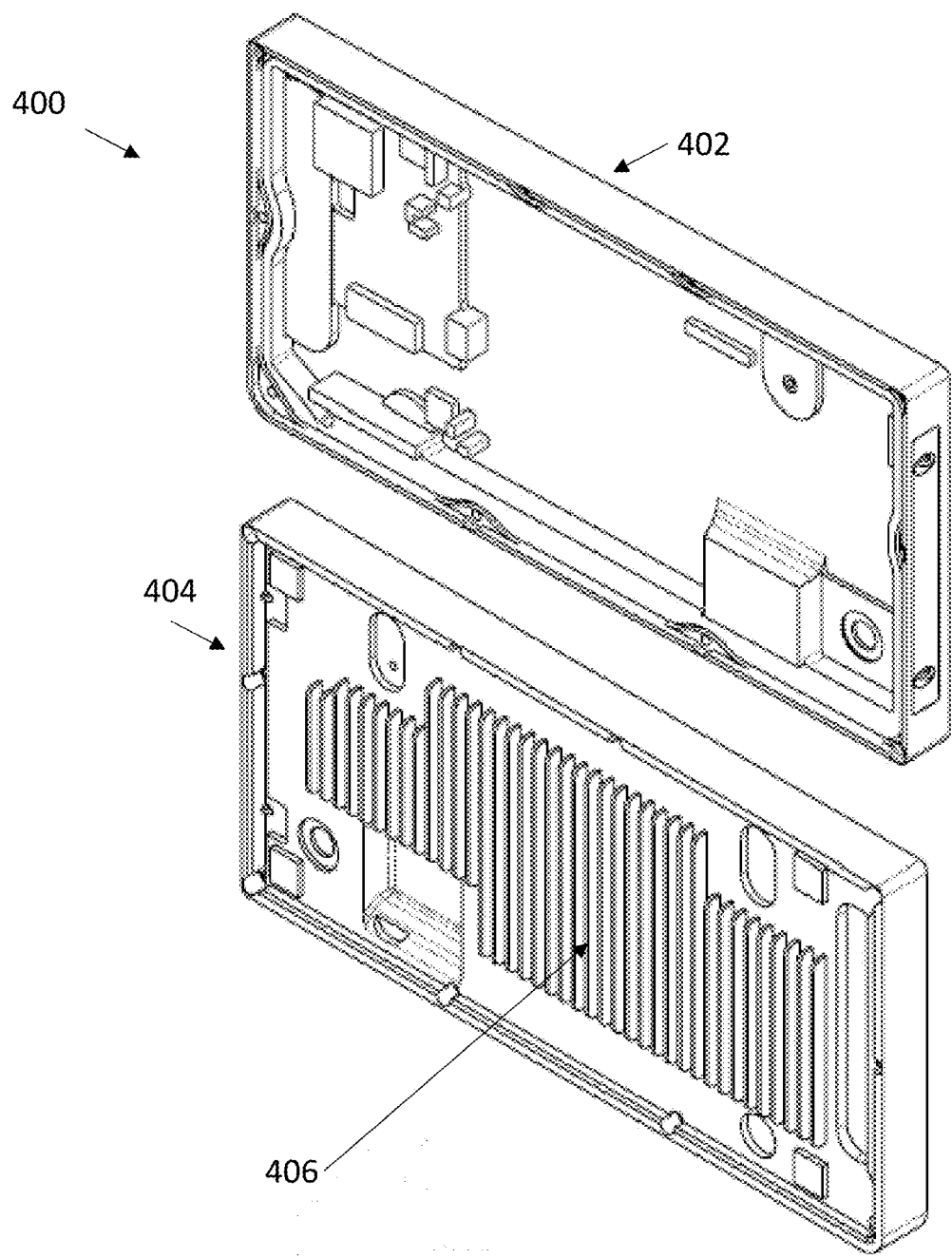
FIG. 4 depicts two views of a bezel.

FIG. 4 depicts two views 400 of a bezel, illustrating cooling fins. The view 400 in FIG. 4 shows a bezel 402 that functions as a frame surrounding digital display 110. 404 is an alternate view of bezel 402, showing a set of cooling fins 406. Cooling fins 406 function to radiate heat away from digital display 110, thereby helping reduce the heating rate associated with digital display 110.

In some embodiments, heat conduits may be included as a part of bezel 402, where heat conduits contact circuit board components directly to funnel heat away, and may also include some sort of heat-transfer compound (possibly in the form of a gel or paste) to help with heat conduction. Other embodiments may use thermoelectric cooling (e.g. Peltier devices) to provide active cooling for display system 110.

A suitable thermal control system such as discussed briefly with respect to FIG. 2 is also useful for ensuring reliable operation under a range of conditions. As discussed with respect to FIG. 1, display system 100 may be mounted on the exterior of a vehicle, and may be subject to a range of temperatures. Furthermore, display system 100 generates heat due to power dissipation in the associated components such as display 110. In some conditions, it might be important to prevent display system 100 from overheating. Presented below is a description of how overheating effects in display system 100 can be reduced. One strategy to regulate the amount of heat generated is to reduce the brightness of display 110 in accordance with the detected temperature associated with display system 100.

The control logic for temperature regulation is created based on data collected from experimental bench testing of the device. Some important variables of the control logic to determine the upper temperature limit at which to restrict the device are the amount to decrease the brightness when the limit is reached; the lower limit temperature at which to begin increasing the brightness; the amount to increase the brightness once the device is in a safe temperature range; the sample rate for checking the brightness and temperature; and the maximum brightness level, which is varied depending upon the ambient light levels.

Figure 5:
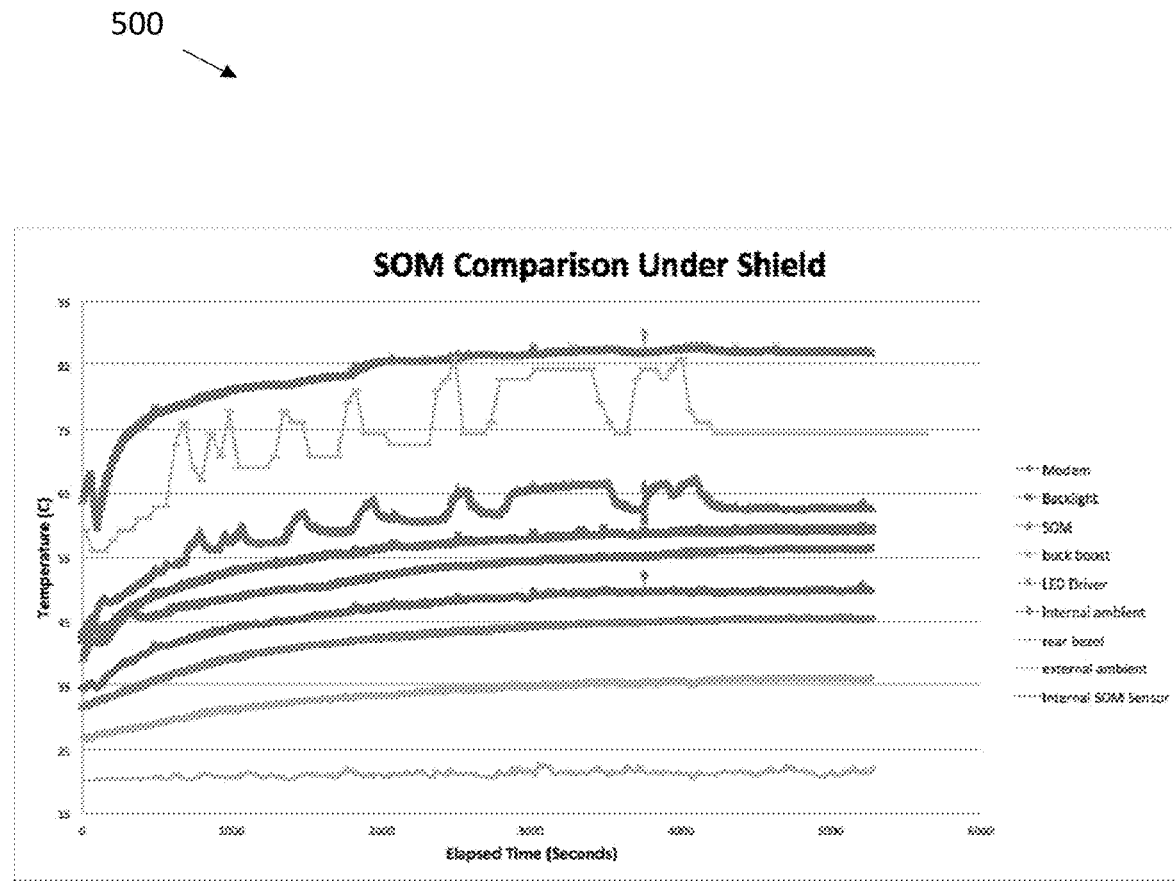
FIG. 5 is a graph illustrating component temperatures over time.

The current maximum allowable temperature of the device is set at a defined temperature as read by a systemon-microprocessor (SOM) sensor. To ensure that this temperature is not reached, the upper temperature limit needs to be some amount lower than this. To determine when to start decreasing the brightness, the following set of data as shown in FIG. 5 is used as a baseline. The graph in FIG. 5 shows a test run where the device was being restarted after running for a while, with no time to cool down. This is a worst-case scenario for SOM temperatures. In this data set the SOM makes jumps of 8.5° C. in 60 seconds. Assuming sampling data every 60 seconds for the control logic, the plate should be stopped at 8.5° C. less than the maximum temperature of 79.2° C. For this reason, the temperature at which to restrict the device is set to 70.7° C.

Figure 6:
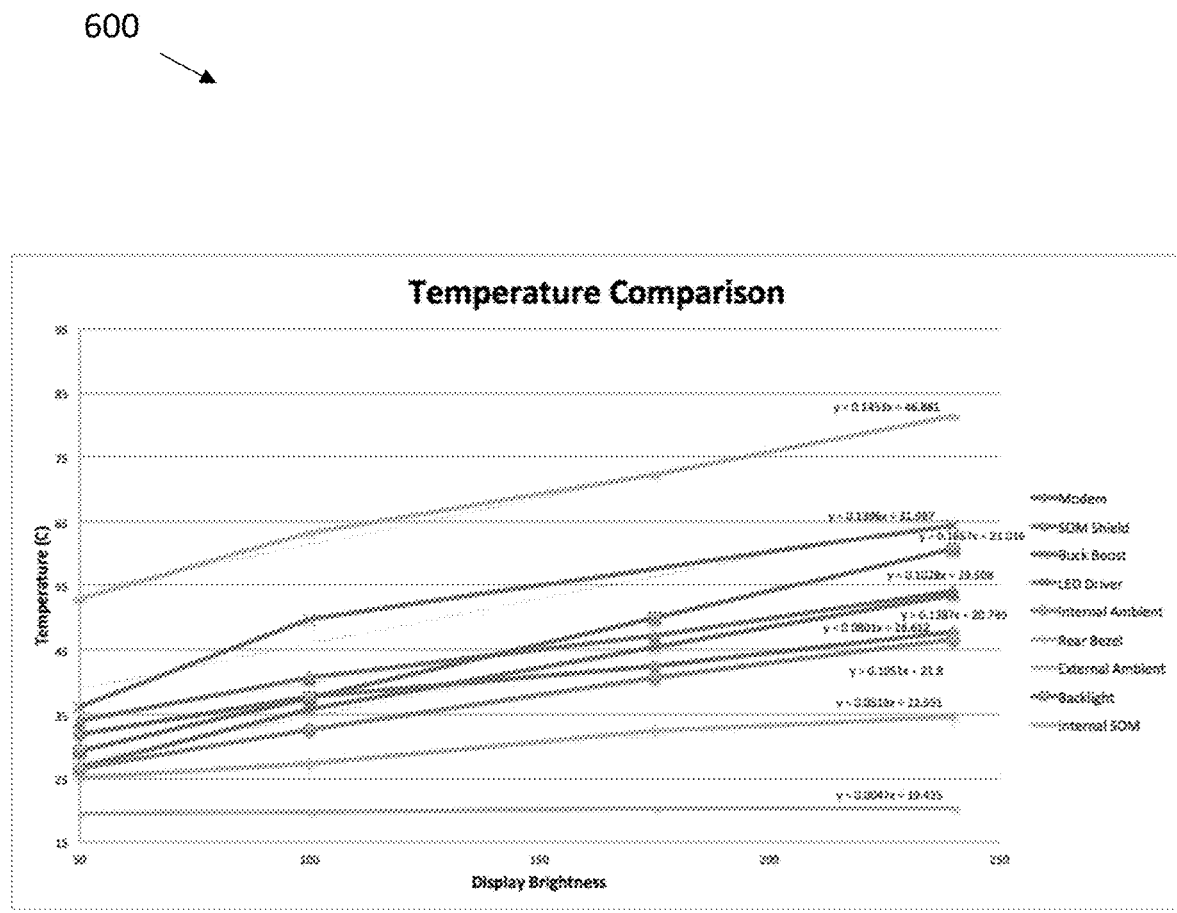
FIG. 6 is temperature comparison illustrating the effect of decreasing display brightness has on system temperature.

FIG. 6 illustrates the effect decreasing display brightness has on system temperature.

FIG. 7 depicts a table 700 that shows how temperature decrease correlates with 10%, 15% and 20% decrement steps in display brightness.

Figure 8:
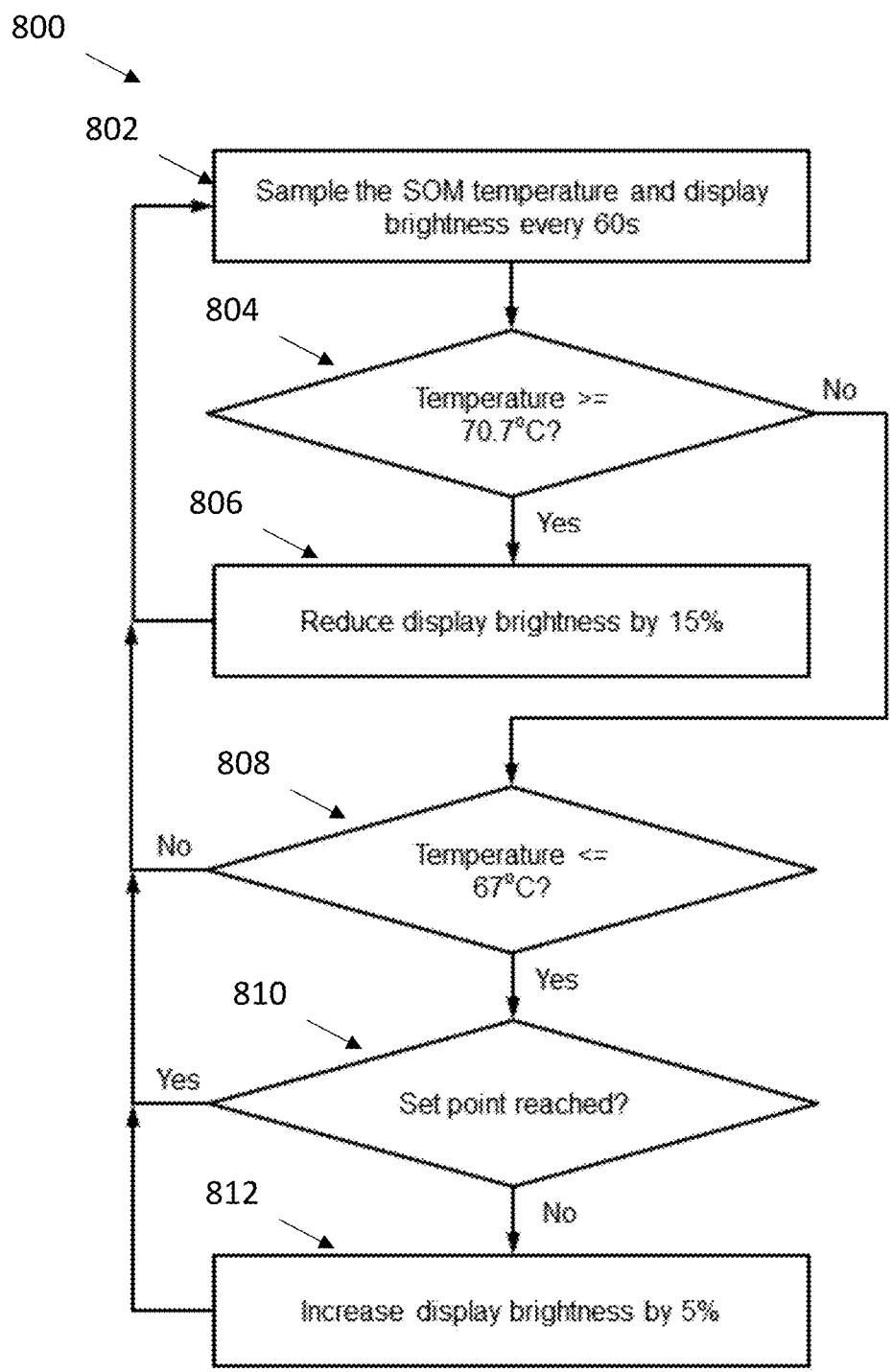
FIG. 8 is flowchart illustrating a temperature management method.

FIG. 8 depicts a flow diagram illustrating one embodiment of a method 800 to implement brightness control logic. At 802, the method samples the SOM temperature and display brightness at defined time intervals (e.g. every 60 seconds). At 804, the method checks to see whether the temperature is greater than or equal to 70.7° C. If the temperature is greater than or equal to 70.7° C., the method proceeds to 806, where the method reduces display brightness by 15%, after which the method returns to 802. At 804, if the temperature is not greater than or equal to 70.7° C., then the method goes to 808, where it checks to see whether the temperature is less than or equal to 67° C. If the temperature is not less than or equal to 67° C., then the method returns to 802. If, at 808, the temperature is less than 67° C., the method goes to 810, where it checks to see if a set point has been reached, where the term "set point" is used to refer to a predetermined brightness value. If the set point has been reached, then the method returns to 802, otherwise the method goes to 812, where it increases the display brightness by 5% or any other preset value and returns bask to 802.

In effect, a lower temperature threshold is set, below which point the screen brightness will be increased. Once the display system has reached safe temperatures, the brightness should begin to increase back towards the set point slowly so that the device does not get stuck in a loop of increasing and decreasing the brightness. Since brightness is being stepped down at 15% increments, the brightness will be increased at 5% increments once the temperature is below the set value. This built-in hysteresis prevents it from getting stuck in a loop of changing the brightness. In some embodiments, a quicker sampling rate may allow for finer adjustment of the brightness at the risk of false actions taken due to noise in the temperature sensor. The brightness set point can be generated from the ambient light sensor in the device on boot up, and recalibrated every 60 seconds thereafter.

Figure 9:
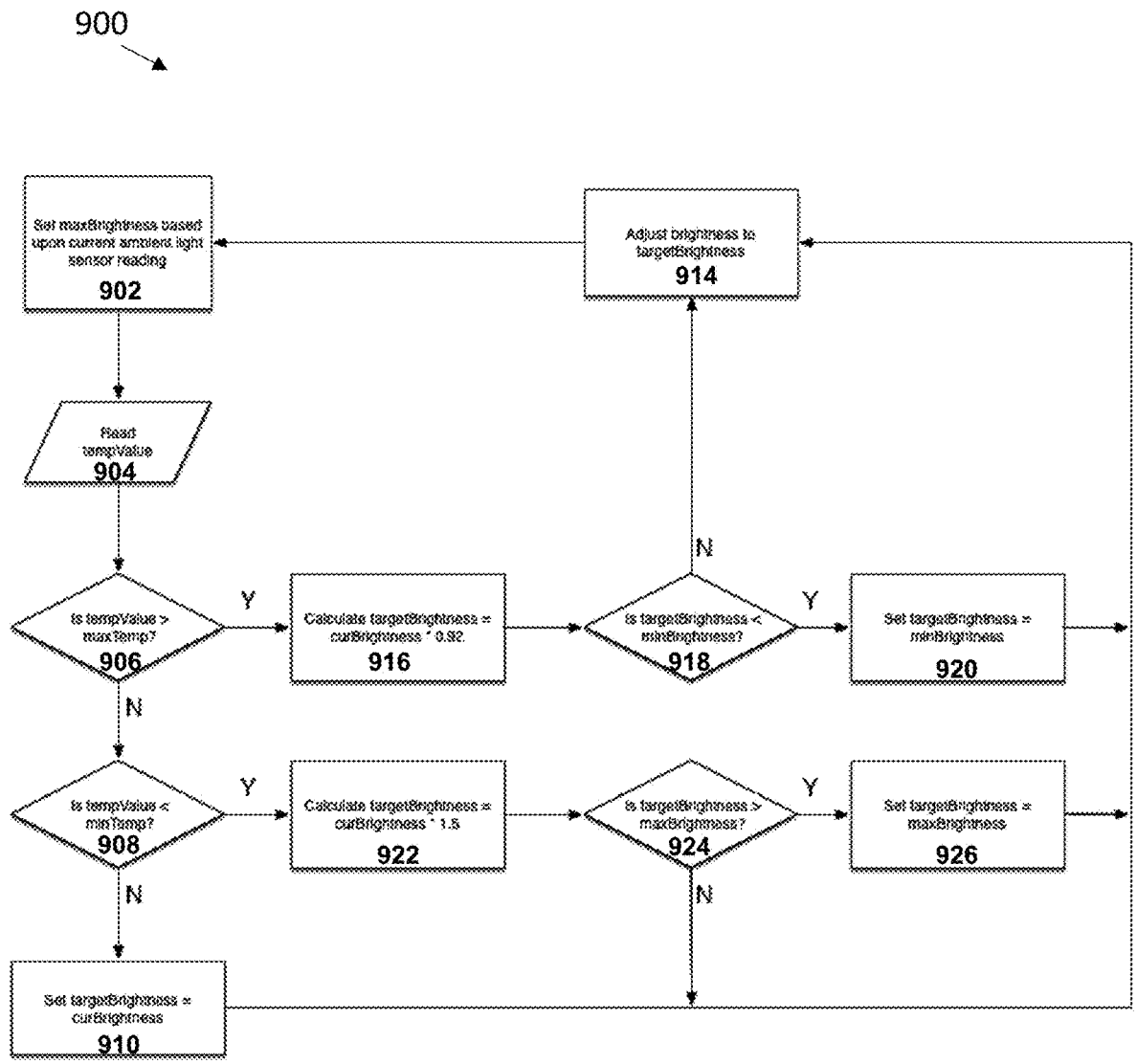
FIG. 9 is a flowchart illustrates an alternate temperature management method.

FIG. 9 is a flowchart 900 illustrating plate temperature management. Temperature management is accomplished by varying the brightness of the screen, thus varying power consumption which, in turn, directly affects heat dissipation and the associated ambient temperature. At 902, the method sets the value of the parameter maxBrightness based on an ambient light sensor reading. At 904, the method reads a temperature value, assigning it to the variable tempValue. Next, at 906, the method compares tempValue to a predetermined maximum temperature value, denoted by the variable maxTemp. In some embodiments, the value of maxTemp may be 75° C. If, at 906, the method determines that tempValue is not greater than maxTemp, the method proceeds to 908, where the method compares tempValue to a predetermined minimum temperature value, denoted by the variable minTemp. In some embodiments, the value of minTemp may be 45° C. If, at 908, the method determines that tempValue is not less than minTemp, the method proceeds to 910, where it sets the target brightness level, denoted by the variable targetBrightness, to the current brightness value, denoted by the variable curBrightness. The method then goes to 914, where the brightness of the screen is adjusted to the value of targetBrightness, after which the method returns to 902.

Referring back to 906, if the method determines that tempValue is greater than maxTemp, then the method goes to 916, where targetBrightness is calculated as a scaled-down version of the current brightness, where the current brightness is denoted by the variable curBrightness. In some embodiments, targetBrightness may be assigned a value of 0.92×curBrightness. Next, at 918, the method checks to see whether targetBrightness is less than a minimum allowable brightness value, denoted by a variable minBrightness. If targetBrightness is not less than minBrightness, the method goes to 914, where the brightness of the screen is adjusted to the value of targetBrightness, after which the method returns to 902. If, at 918, targetBrightness is less than minBrightness, then the method goes to 920, where targetBrightness is assigned the value of minBrightness. The method then goes to 914, where the brightness of the screen is adjusted to the value of targetBrightness, after which the method returns to 902.

Referring back to 908, if the method determines that tempValue is less than minTemp, then the method goes to 922, where targetBrightness is calculated as a scaled-up version of the current brightness, where the current brightness is denoted by the variable curBrightness. In some embodiments, targetBrightness may be assigned a value of 1.5×curBrightness. Next, at 924, the method checks to see whether targetBrightness is greater than a maximum allowable brightness value, denoted by a variable maxBrightness. If targetBrightness is not greater than maxBrightness, the method goes to 914, where the brightness of the screen is adjusted to the value of targetBrightness, after which the method returns to 902. If, at 924, targetBrightness is greater than maxBrightness, then the method goes to 926, where targetBrightness is assigned the value of maxBrightness. The method then goes to 914, where the brightness of the screen is adjusted to the value of targetBrightness, after which the method returns to 902.

In some embodiments, digital display 110 may be a bistable display. Under low operating temperatures, a bistable display may need to be externally heated for the bistable display to correctly transition. Under high operating temperatures, there can be difficulties in switching unless the bistable display is maintained below a defined temperature, or at least temporarily cooled. Due to the differences in the operating temperatures of bistable displays and an LCD, temperature controls might be programmed differently with the bistable display versus the LCD.

Figure 10:
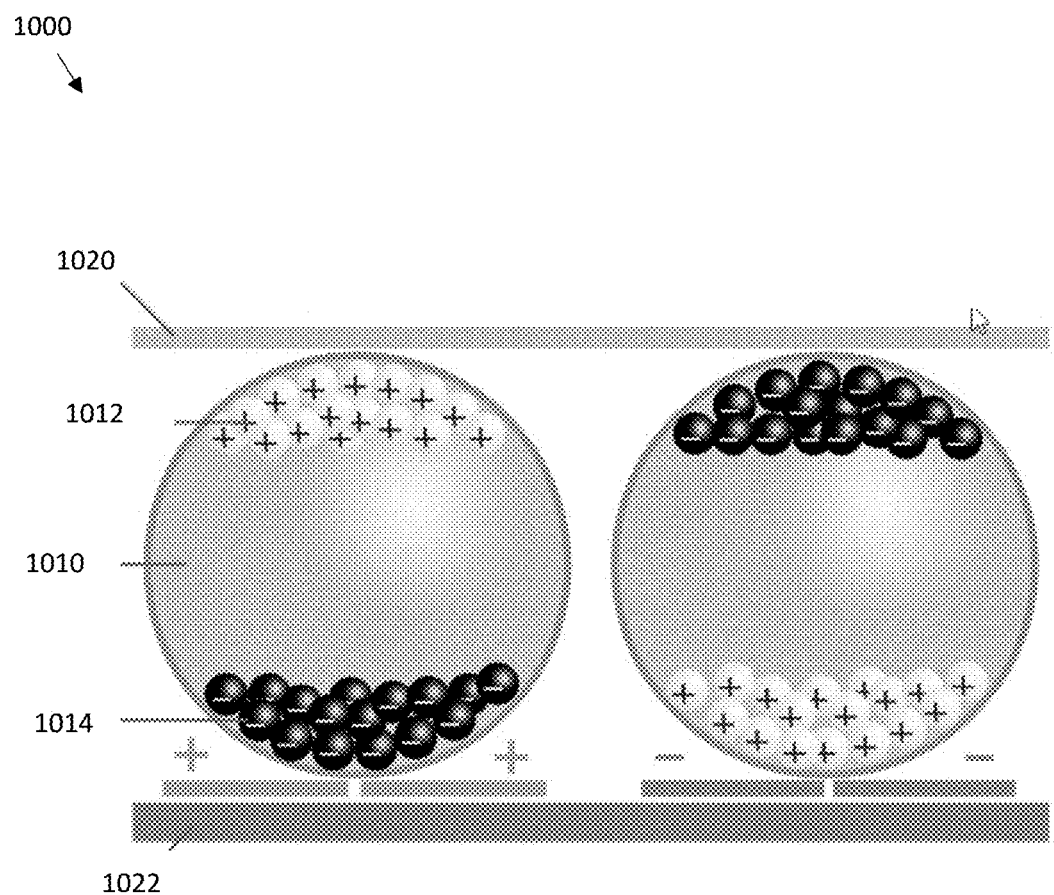
FIG. 10 illustrates bistable display components.

FIG. 10 is a cartoon detail 1000 of pigmented microspheres in an electrophoretic display containing white and black pigment material. Such bistable displays are commonly available from E Ink Corporation, and as illustrated in FIG. 10, include a microsphere 1010 containing a transparent oil, positively charged white pigments 1012 and negatively charged black pigments 1014. Bistable switching of the microsphere 1010 orientation is enabled by transparent electrode 1020 and addressable pixel electrodes 1022.

Alternative embodiments using only a single pigment material and a colored oil are also possible. In those embodiments, the electrophoretic dispersion has one type of charged pigment particles dispersed in an oil or oil mixture of a contrasting color. When a voltage difference is created between the transparent electrode 1020 and the pixel electrode 1022, the pigment particles migrate electrode of polarity opposite that of the pigment particles. The color showing at the transparent electrode 1020 may be either the color of the solvent or the color of the pigment particles. Reversal of electrode polarity will cause the particles to migrate back to the opposite pixel electrode 1022, thereby reversing the color.

Performance of such bistable displays can be improved for digital license plates such as discussed herein. For example, to improve readability, white pigment particles can be formed from, or associated with, materials that reflect infrared light. This improves readability using infrared sensitive camera systems. In another embodiment, for improved twilight or low light readability, the white pigment particles can be formed from, or associated with, materials that fluoresce or are phosphorescent. In still other embodiments, the white pigment particles can be formed from, or associated with, heat rejecting or heat absorbing materials that reduce or increase temperature to help maintain the bistable display of the digital license plate within operational temperature limits.

Under low operating temperatures, a bistable display may need to be externally heated for the bistable display to correctly transition. At low temperatures, the e-ink may need an external source of heat in order for it to be able to transition, since the lower bound of its operating temperature range is higher than LCDs. Attached heating elements, heating pipes, battery or vehicle powered heating elements can all be used to ensure that the bistable display is maintained or temporarily brought above the minimum display switching temperature when switching is required. Use of a heating element allows, for example, activation of a heater to bring the display above the minimum display switching temperature, followed by deactivation of the heater and consequent drop in temperature below the minimum display switching temperature. Other components that might be heated other than the bistable display may include any associated circuit boards, and the battery system.

For embodiments without associated heaters (or when the heater does not generate sufficient heat to compensate for cold temperatures), operation of the bistable display can be adjusted to compensate. For example, in one embodiment, as temperature is reduced near to a lower operational temperature limit, the digital license plate can be set to display only the legally required information. Advertisements that could interfere with display of legally required information or dynamic displays that could partially or completely fail to switch due to cold temperatures would not be allowed. In effect, for example, a vehicle maintained in a heated garage would be able to display the full range of visual effects possible in the digital license plate. If the vehicle moves into an environment with sub-zero temperatures, a temperature sensor could provide warning data of low temperature conditions, the digital license plate would switch to a display of only the legally required information or information that would not interfere with viewing of the legally required information. Similarly, embodiments that with active or passive cooling systems can support methods to ensure that the digital license plate will switch to a display of only the legally required information or information that would not interfere with viewing of the legally required information before temperatures reach a maximum display switching temperature.

Critical temperatures vary according to material and type of display. For example, an e-ink bistable display may have a normal operating temperature range above 0 degrees Celsius and below 50 degrees Celsius. Actions to compensate for low or high heat conditions can begin before a critical temperature is reached. For example, a display pattern that impacts reflectivity can be adjusted to increase reflectivity as the sensed temperature increases above 40 degrees Celsius. Optional cooling elements can be activated if the temperature continues to increase, and the display can be locked into a non-switching state if temperature continues to rise, with the digital license plate acting to display only the legally required information or information that would not interfere with viewing of the legally required information. Similarly, at low temperatures, display pattern (reflectivity) can be adjusted to decrease reflectivity (i.e. increase absorption) as the sensed temperature decreases below 10 degrees Celsius. Optional heating elements can be activated if the temperature continues to decrease, and the display can be locked into a non-switching state if temperature continues to fall, with the digital license plate acting to display only the legally required information or information that would not interfere with viewing of the legally required information. Typically, actions taken to compensate for high or low heat conditions begin within 15, 10, or 5 degrees Celsius of the critical temperature, and can be ordered so that actions requiring little or no power or having a low visual impact are implemented before actions requiring a substantial amount of power or having a greater impact on display messaging are implemented.

As will be understood, temperature of a display can be directly or indirectly measured. Electronic thermometers with associated temperature control modules can be attached to the display, attached near or in the vicinity of the display, or attached somewhere on a vehicle. Ambient temperatures can be measured, and an indirect determination of likely display temperature can be made. In certain embodiments, predicted temperatures can be used. For example, if the digital license plate receives predicted or calculated overnight temperature information, protective measures can be immediately engaged when the vehicle is parked near the end of a day. While not as accurate as direct measurement of the display temperature, ambient or other indirect temperature measurement can be accurate enough to engage protective measures when needed as critical temperatures are approached.

In one embodiment, a display system supporting modifiable heat relevant display parameters includes a temperature sensor positioned to measure temperature of the display system. A temperature control module can be connected to the temperature sensor and configured to modify heat relevant display parameters as critical temperatures are approached. Modifiable heat relevant display parameter includes brightness, with brightness being increased as critical low temperatures are approached and decreased as critical high temperatures are approached. In another embodiment, the modifiable heat relevant display parameter includes a displayed pattern to modify reflectivity, with the displayed pattern being modified to increase heat absorption as critical low temperatures are approached and modified to decrease heat absorption as critical high temperatures are approached.

Figure 11:
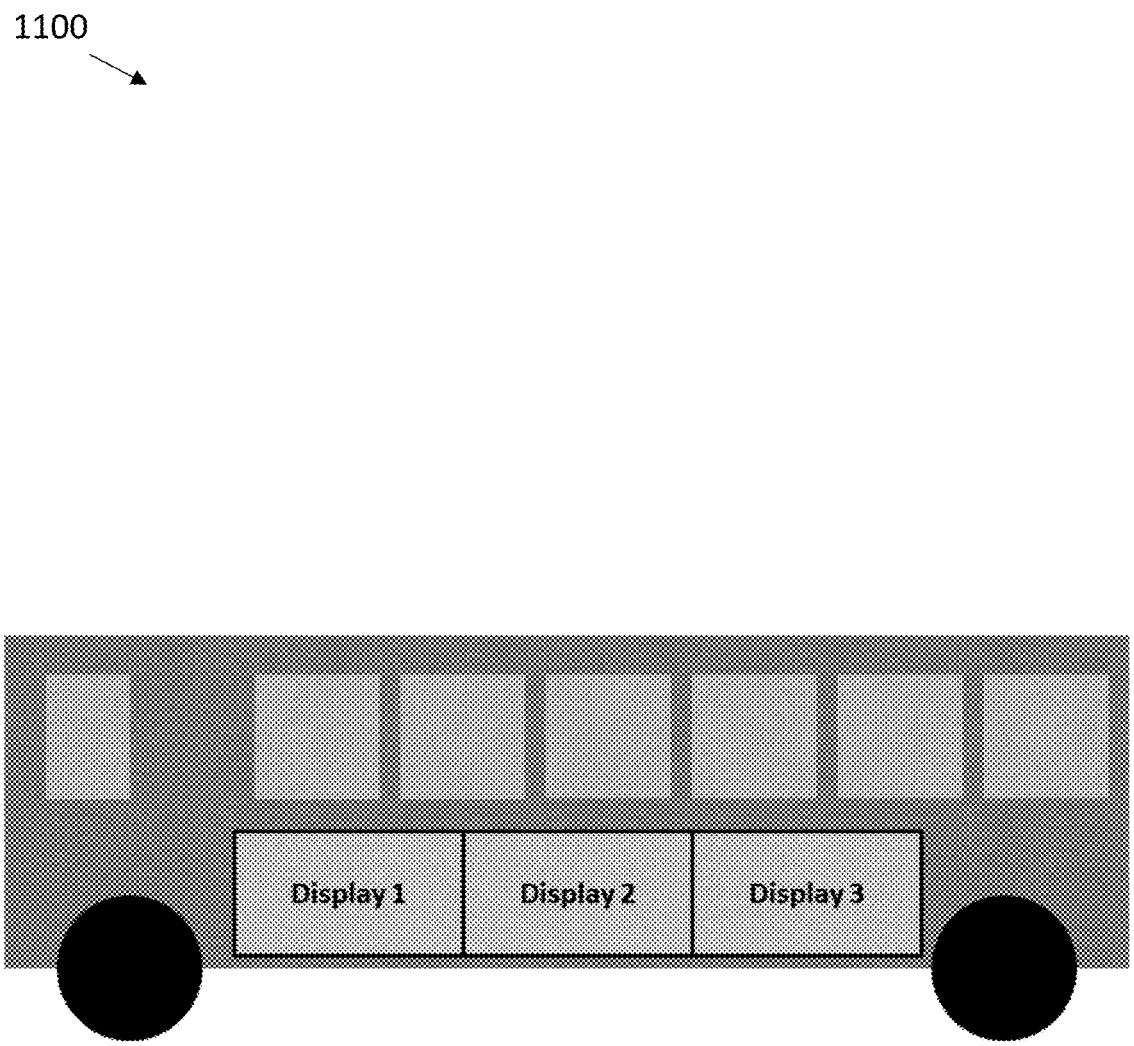
FIG. 11 illustrates positioning of multiple displays on a vehicle.

Applications of display system are not limited only to vehicle license plates. For example, the display can be composed of multiple homogeneous tiles, a large heterogenous display with inset tiles (e.g. a bistable or electrophoretic display with LED display sections), or have distinct color and bistable sections. In addition, the display system can control multiple additional displays positioned on the interior or exterior of a vehicle. For example, such displays may be tiled and placed on the side of a bus, as shown in FIG. 11. Tiling displays may increase the number of options available to present media to an intended audience. The example illustrated in FIG. 4 shows the displays 1100 placed on the side of a bus; a similar set of tiled displays may be implemented on the back of the bus as well. The systems and methods described herein can all be extended to include display ensembles as shown in FIG. 11.

Some embodiments include a larger display (say 16"×16" for example), a portion of which can show the plate image, while the rest can be used for static messaging. This way messages and plate image can be displayed simultaneously.

Figure 12:
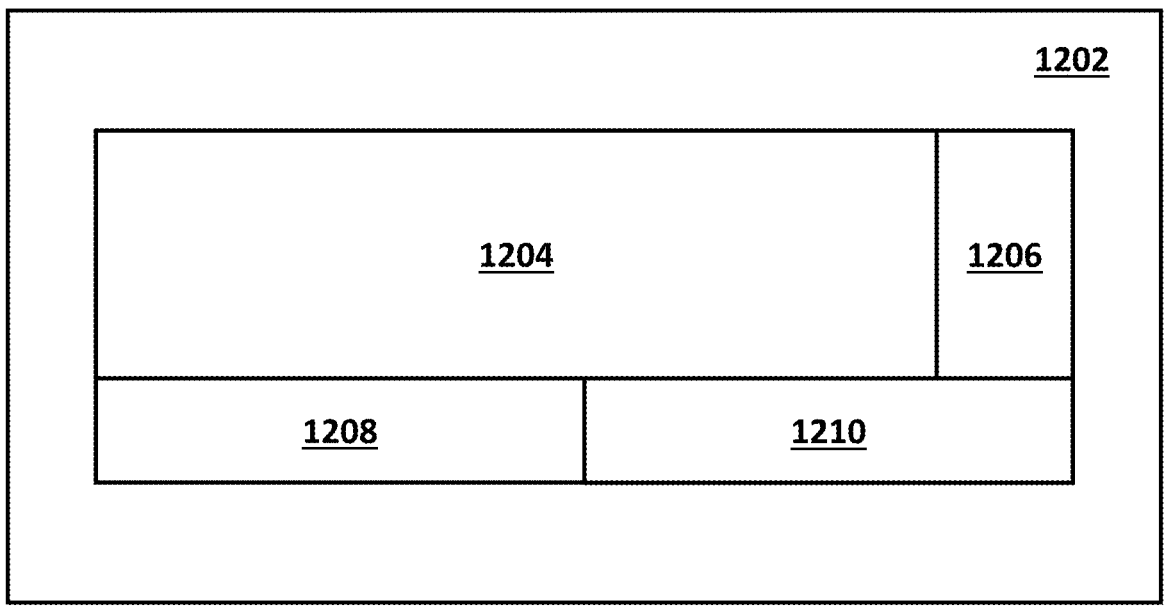
FIG. 12 illustrates multiple sub-displays.

FIG. 12 is a diagram illustrating a display 1200 comprised of multiple sub-displays. In some embodiments, a display may be comprised of sub-displays of similar or different kinds tiled together. As seen in FIG. 12, display 1200 may have an outer frame display 1202, an inner sub-display 1204, an inner sub-display 1206, an inner sub-display 1208 and an inner sub-display 1210. Outer frame display 1202 and inner sub-display 1204-1210 may be configured to display different media content. For example, outer frame display 1202 may be configured to display vehicle license and registration information, while sub-display 1204-1210 may display different advertising and/or promotional messages. In one embodiment, sub-display 1206 could be, for example, a color OLED display able to accurately display a replica of a colored annual registration sticker. In other embodiments, outer frame display 1202 and sub-display 1204-1210 may be comprised of different display kinds. For example, outer frame display 1202 may be a bistable display, sub-display 1204 may be an OLED display, sub-display 1206 may be an LCD display, and sub-display 1208-1210 may each be a bistable display.

Measures to prevent display system from damage from road debris or similar hazards may include physical protective covers made from, for example, Plexiglas or sapphire crystal. Hydrophobic coatings may also be applied to the exterior surface of display system to prevent damage due to exposure to liquids such as water. In other embodiments, self-cleaning glass using nanocrystalline titanium dioxide coatings, plasma-chemical roughening, photo-catalytic cleaning structures, molded polymeric layers, or other suitable hydrophobic or hydrophilic system can be used. Thermal protection can be provided by an IR-blocking coating. The display system may also be integrated into the vehicle structure itself. For example, a curved or flexible display may be used to conform aesthetically to a vehicle design. An embodiment of display system 100 may, for example, be conformably integrated into a bumper of a vehicle.

Figure 13:
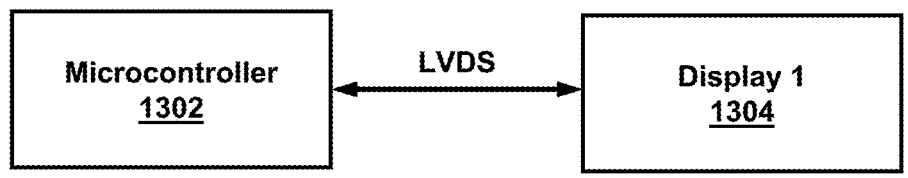
FIG. 13 illustrates multiple types of displays.
Figure 13:
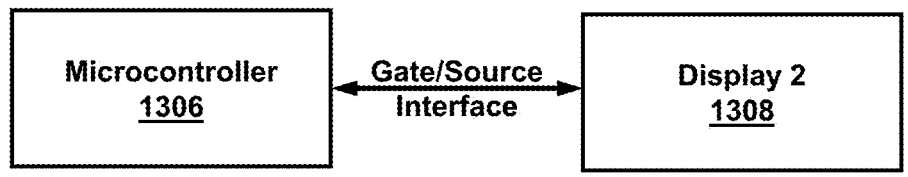
Figure 13:
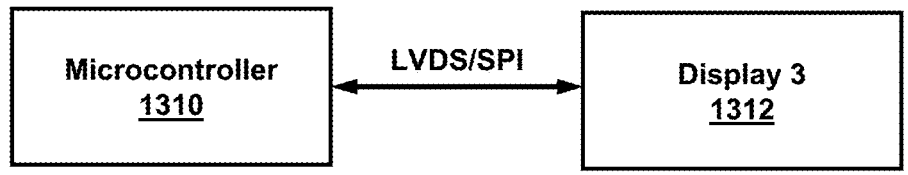

FIG. 13 is a block diagram 1300 illustrating display communication protocols. In some embodiments, low voltage differential signaling (LVDS) communication interface may be implemented between a microcontroller 1302 and a display 1 1304. In other embodiments, a gate/source interface may be implemented between a microcontroller 13013 and a display 2 1308. In still other embodiments, a low voltage differential signaling or serial peripheral interface (LVDS/SPI) communication interface may be implemented between a microcontroller 1310 and a display 3 1312. In some embodiments, other display communication technologies such as HDMI may be used to implement the communication link between the processing device and the display device, where the processing device may be a microcontroller such as microcontroller 1302 or any other suitable processing device such as a microprocessor, a digital signal processor, a field-programmable gate array and so on.

Display 1 1304, display 2 1308, and display 3 1312 may be any of an LCD display, a TFT LCD display with and LED backlight, a bistable display with a front LED light, or any other suitable display. Any combination of signaling methods may be used to communicate between a microcontroller and a display, including LVDS, SPI, parallel port interface, serial port interface, RS232, and so on. In certain embodiments, one or more displays controlled by the foregoing discussed signaling methods and protocols can be positioned at a distance from the digital license plate, either within or on the exterior of the vehicle.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A digital license plate comprising:
   display system supporting modifiable heat relevant display parameters;
   a temperature sensor positioned to measure temperature of the display system; and
   a temperature control module connected to the temperature sensor and configured to modify heat relevant display parameters as critical temperatures are approached;
   wherein the modifiable heat relevant display parameters include a displayed pattern to modify reflectivity.

2. The digital license plate of claim 1, wherein the critical temperatures are below 0 degrees Celsius and above 50 degrees Celsius.

3. The digital license plate of claim 1, wherein the modifiable heat relevant display parameters include brightness.

4. The digital license plate of claim 1, wherein the modifiable heat relevant display parameters include brightness, with brightness being increased as critical low temperatures are approached and decreased as critical high temperatures are approached.

5. The digital license plate of claim 1, wherein the display system is programmed to modify the displayed pattern to increase heat absorption as critical low temperatures are approached and modified to decrease heat absorption as critical high temperatures are approached.

6. The digital license plate of claim 1, wherein the display system further comprises an LCD.

7. The digital license plate of claim 1, wherein the display system further comprises an OLED display.

8. The digital license plate of claim 1, wherein the display system further comprises a bistable display.

9. The digital license plate of claim 1, wherein the display system further comprises a heating element.

10. The digital license plate of claim 1, wherein the display system further comprises a
    a plurality of sub-displays, with at least one sub-display being bistable and at least one sub-display being a color LCD or OLED display.

11. A method of operating a digital license plate comprising the steps of:
    measuring temperature of a display system supporting modifiable heat relevant display parameters;
    modifying heat relevant display parameters as critical temperatures are approached; and
    displaying only legally required information or information that would not interfere with viewing of the legally required information as critical temperatures are approached.

12. The method of operating a digital license plate of claim 11, wherein the critical temperatures are below 0 degrees Celsius and above 50 degrees Celsius.

13. The method of operating a digital license plate of claim 11, wherein the modifiable heat relevant display parameters include brightness, with brightness being increased as critical low temperatures are approached and decreased as critical high temperatures are approached.

14. The method of operating a digital license plate of claim 11, wherein the modifiable heat relevant display parameters include a displayed pattern to modify reflectivity, with the displayed pattern being modified to increase heat absorption as critical low temperatures are approached and modified to decrease heat absorption as critical high temperatures are approached.

15. The method of operating a digital license plate of claim 11, further comprising the step of activating heaters.

16. A method of operating a digital license plate having a bistable display, comprising the steps of:
    measuring temperature of at least one of ambient temperature or the bistable display;
    modifying heat relevant display parameters as critical low temperatures are approached; and
    displaying only legally required information or information that would not interfere with viewing of the legally required information as critical temperatures are approached.

17. The method of operating a digital license plate of claim 16, wherein the critical temperatures are below 0 degrees Celsius.

18. The method of operating a digital license plate of claim 16, wherein the modifiable heat relevant display parameters include a displayed pattern to increase absorption, with the displayed pattern being modified to increase heat absorption as critical low temperatures are approached.

19. The method of operating a digital license plate of claim 16, further comprising the step of activating at least one of a heater and a cooler.

\* \* \* \* \*